April 19, 1960  A. M. WRIGHT  2,933,129
FLUID CLUTCH CONTROLLED VORTEX PUMP
Filed Nov. 15, 1951
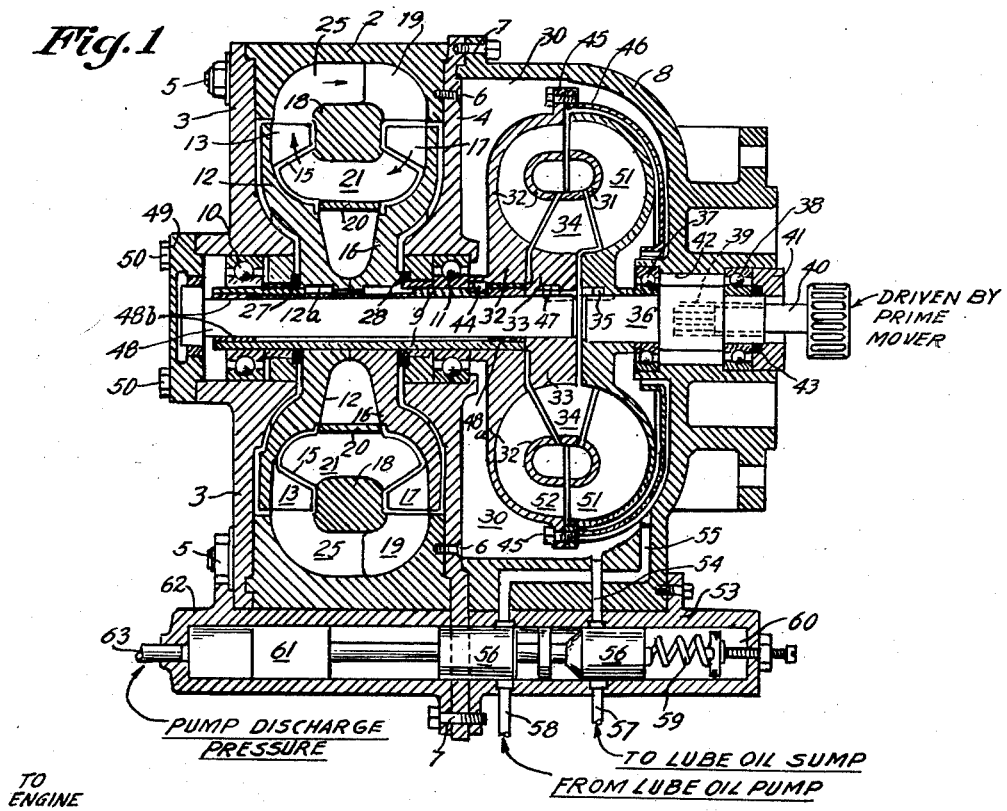
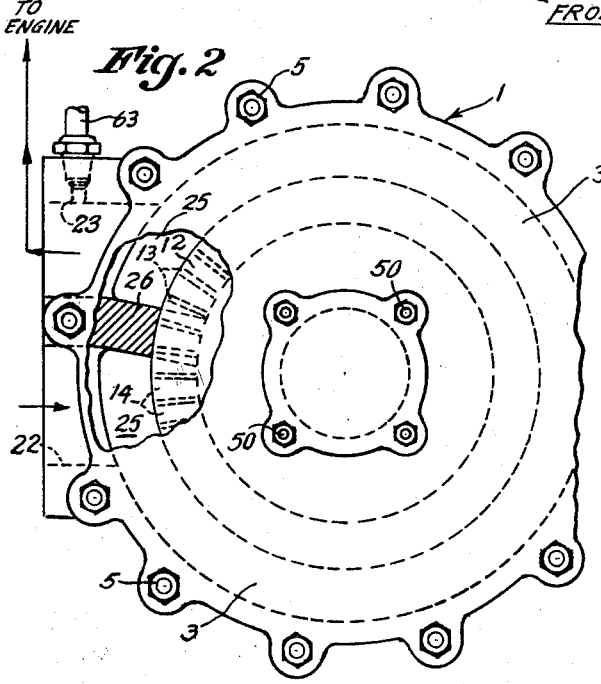
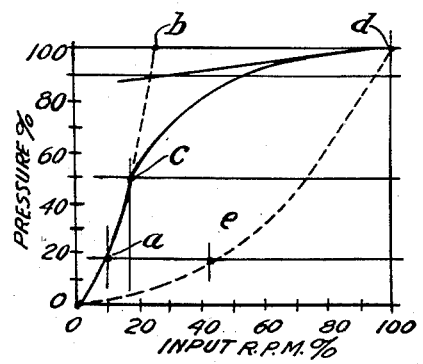
INVENTOR
A.M. WRIGHT
BY
ATTORNEY – # United States Patent Office 2,933,129
Patented Apr. 19, 1960

2,933,129

FLUID CLUTCH CONTROLLED VORTEX PUMP

Alexander M. Wright, West Hartford, Conn., assignor, by mesne assignments, to Chandler-Evans Corporation, West Hartford, Conn., a corporation of Delaware Application November 15, 1951, Serial No. 256,489

7 Claims. (Cl. 158—36.4)

This invention pertains to high speed, high pressure rotary pumps of the "vortex" type having fixed impeller blades, and more particularly has reference to high efficiency vortex pumps, for use as aircraft engine fuel pumps, as disclosed in my copending application Serial No. 254,022, filed October 31, 1951 now Patent No. 2,842,062, of which this application is a continuation in part.

Fuel pumps for aircraft turbo-jet engines must operate over a wide range of speeds (a typical speed range being from 2,400 r.p.m. to 24,000 r.p.m.), and are required to develop a discharge pressure and volumetric rate which vary generally with their speed (r.p.m.). Single stage, direct-engine-driven, dynamic types of pumps (such as vortex pumps), are either deficient in discharge pressure and capacity at low fractions of rated speed, or develop excessive capacity at 100 percent of rated speed. To overcome this difficulty and to insure that the pump discharge pressure and rate will vary as a selected function of its speed, and particularly, that the pump will develop the desired discharge pressure and rate at both minimum and maximum speeds, various proposals have been entertained, such as:

(a) A multiple stage centrifugal pump, with auxiliary valving to permit the pump to start with all stages in series to give the required pressure at say 10 percent of rated speed, the valving being so arranged that the stages are switching to parallel operation as 100 percent rated speed is approached. With this arrangement, if the design point is assumed to be 4,000 pounds per hour flow at 2,400 r.p.m., and if the pump is further arranged so as to operate near its design point at 24,000 r.p.m., then the pressure per stage at 24,000 r.p.m. will be 100 times the pressure per stage at the lower speed. It therefore appears that where the pressure is to vary say linearly with engine speed, and for operation near the design point both at 2400 and at 24,000 r.p.m., a ten stage pump would be required. It is obvious that this arrangement results in an excessively large and complicated design. It has the further disadvantage that if a large drop in pressure is to be avoided at the point of switching from series to parallel the valving would have to be very complicated.

(b) The same general scheme as under (a) using a "vortex" type pump, instead of a centrifugal pump. The vortex type pump gives a fairly high pressure in a single stage but for operation near the design point both at the low speed and at the high speed condition would again require a 10 stage pump plus auxiliary valving.

(c) Using a compound gear-centrifugal pump comprising a gear pump, for operation at 10 percent of rated speed, and a gear plus centrifugal pump for 100 percent rated speed, with a control valve to coordinate the operation of the pumps.

The primary object of this invention is to provide a fuel pump which meets the requirements, mentioned in column 1 lines 23 to 27, without resorting to the use of multiple pumps and complicated control valve mechanisms involved in the schemes mentioned in (a), (b) and (c), supra.

Another object is to devise a fuel pump which comprises a single stage, high efficiency vortex pump (such as that disclosed in my copending parent application), a variable speed drive, and a suitable control mechanism to obtain a pump speed that is a selected function of engine speed; all contained within the same housing and thus constituting a relatively small and compact unit.

Still another object is to provide a fuel pump, combining in a single unit, a single stage, high efficiency vortex pump, with a variable speed drive, in the form of a torque converter, with a suitable control adapted to give the desired pump speed-discharge pressure (and rate) characteristic.

With these and other objects in view which may be incident to my improvements, my invention consists in the combination and arrangement of elements hereinafter described and illustrated in the accompanying drawing, in which:

Fig. 1 shows a central longitudinal section (somewhat diagrammatic) of my improved pump with variable speed drive and control mechanism;

Fig. 2 is an elevation of the left side of the pump shown in Fig. 1; and

Fig. 3 is a diagram showing the speed-discharge pressure (and rate) characteristic of my improved pump.

Referring to Fig. 1, the reference numeral 1 denotes a pump housing comprising a central annular member 2, an outer end plate 3 and an inner end plate 4, which are secured to member 2 by bolts 5 and 6, respectively. Attached to inner end plate 4 by bolts 7 is a torque converter housing 8. At the center of housing 1 is journalled a hollow, tubular shaft 9, supported by ball bearings 10 and 11, and on which a pump impeller 12 is mounted and fixed by a key 12a. Near its outer periphery, impeller 12 is provided with a series of flat, radial blades 13, integral with the impeller, which define an equal series of buckets 14 (see Fig. 2). Blades 13 have their inner edges undercut with contoured notches 15, as shown in Fig. 1.

Also mounted upon and keyed to shaft 9 is a turbine rotor 16 having near its outer periphery a series of curved blades 17 of approximately the same size as blades 13. Attached to housing member 2 is a central web member comprising an outer ring 18, carrying a series of contoured stator guide vanes 19 which are shaped and arranged to complement turbine blades 17, and an inner ring 20, carrying a second series of contoured stator guide vanes 21, which are shaped and arranged to complement impeller blades 13 and turbine blades 17; as clearly shown in Fig. 1. Housing member 2 is provided with a fluid inlet 22 and an adjacent fluid outlet 23, which communicate with an annular fluid passage 25 in housing 2 and are separated by a baffle wall 26 that extends radially inward across passage 25, to the outer periphery of impeller blades 13, as shown in Fig. 2. Baffle 26 abuts impeller blades 13 and stator vanes 19 with a minimum running clearance, and thus serves as a cut-water to prevent the return of fluid from the discharge end to the inlet end of passage 25. It will also be understood that when the pump is assembled as shown in Fig. 1, the adjacent edges of stator vanes 19 and 21 abut turbine blades 17 and impeller blades 13 with the minimum clearance to insure free running of turbine rotor 17 and impeller 13. Shaft seals 27 and 28 prevent escape of fluid from housing 1, during operation of the pump.

With the arrangemnet of parts as just described and shown in Figs. 1 and 2, fluid entering inlet 22 flows into passage 25 and thence moves with a general vortex or toroidal motion through vanes 19, turbine blades 17, and vanes 21 to impeller blades 13, being at the same time carried in a peripherial direction in passage 25 toward discharge outlet 23. As in a conventional vortex pump, the fluid entering buckets 14 in impeller 12 is rotated by said impeller toward the outer wall of housing 2 with an increasing pressure from inlet 22 to outlet 23, owing to the centrifugal force imparted by the rotation of the impeller.

When the fluid reaches the region of the outlet 23, the tangential component of its angular velocity is reduced by the cutwater 26 to zero, or to a small value, depending upon the degree of opening of the pump discharge outlet and the consequent rate of discharge. During rotation of impeller 12 a portion of the fluid in passage 25 flows through stationary guide vanes 19, and from thence, through turbine blades 17 and stationary vanes 21, back to the inner periphery of buckets 14. This flow through guide vanes 19, turbine blades 17, and guide vanes 21 sets up a toroidal or vortex circulation of fluid in passage 25 in planes at right angles to the planes of rotation of impeller 12 and turbine rotor 16, as indicated by the arrows in Fig. 1. While the fluid leaving the tips of pump blades 13 in the region of outlet 23 has its tangential component of velocity reduced by the cutwater to zero (or a small value dependent upon the rate of discharge of the pump), its toroidal or vortex component of velocity remains unimpeded. The fluid in its vortex motion, being directed by stationary vanes 19 into turbine blades 17, imparts a rotation to the turbine rotor 16 in the conventional manner. The energy thus imparted to turbine rotor 16 is transmitted to shaft 9 where it assists in driving pump impeller 12. Accordingly, the energy of the toroidal or vortex circulation of fluid in the pump shown in Fig. 1 does useful work in helping to drive the pump impeller, instead of being absorbed by friction losses, as in the conventional type of turbine pump.

In the novel pump shown in Figs. 1 and 2, the walls of passage 25 and the surfaces of vanes 19, 17 and 21 are made very smooth and of streamlined form so as to minimize the loss of energy due to friction in the toroidal circulation of fluid therein. Hence, the velocity of circulation in the toroidal channel is limited not by friction, but by extracting useful work from the fluid so circulating. By a proper choice of angles and contours of the stationary guide vanes 19 and 21 and the rotating turbine blades 17, nearly all of the energy of the toroidal or vortex circulation of fluid in passage 25 can be extracted and applied to the rotation of the pump drive shaft 9, thus greatly reducing the amount of external power required to drive the pump impeller 12 and correspondingly increasing the overall efficiency of the pump.

Since the amount of toroidal or vortex circulation in the pump shown in Figs. 1 and 2, decreases as the rate of pump discharge increases, the more the rate of discharge is reduced by restricting the outlet passage, the greater the percentage of fluid entering into toroidal circulation and the greater the percentage of energy imparted to drive shaft 9 by the toroidal circulation. Hence, unlike the conventional vortex pumps, there is no material increase in input energy absorption due to fluid turbulence and friction, when the rate of discharge of the pump of Figs. 1 and 2 is decreased by restricting the discharge outlet. On the contrary, the more the outlet of my novel pump is restricted the less the input energy required to operate the pump.

From what has been shown above, it is clear that in the form vortex pump illustrated in Figs. 1 and 2, the toroidal or vortex circulation of fluid in the passage 25 results in a relatively small dissipation of energy due to friction, and the velocity of this circulation is limited primarily by the extraction of useful work in the turbine element. This pump, therefore, retains the advantages of the conventional vortex pump, particularly the development of high pressure in a single element, and at the same time yields overall efficiencies comparable with those of centrifugal pumps.

When a vortex pump, such as disclosed in my copending parent application and hereinabove, is driven directly by the engine to which the pump supplies fuel, the pressure and rate of discharge increase generally as the square of the impeller speed, as indicated by the curve o—a—b in the diagram of Fig. 3. Hence, if such a pump were designed to give at say 2,400 r.p.m. (10 percent of its selected maximum speed of 24,000 r.p.m.) a selected discharge pressure of say 175 pounds per square inch (p.s.i.), as indicated by the point a, corresponding to 17.5 percent of its selected maximum discharge pressure of 1,000 p.s.i. at 24,000 r.p.m., then said pump would develop its maximum selected discharge pressure of 1,000 p.s.i. when its impeller speed was only about 25 percent of its selected maximum speed, as indicated by the point b. At the same time, when the impeller of said pump attained its selected maximum speed of 24,000 r.p.m., its discharge pressure would increase to about 17,500 p.s.i., or one hundred times its selected 10 percent speed value.

Conversely, if the said directly driven pump were designed to give a discharge pressure of 1,000 p.s.i. at 100 percent of its selected maximum speed (24,000 r.p.m.), then its discharge pressure would decrease with impeller speed, as shown by curve d—e—o, so that the discharge pressure would fall to 175 p.s.i., when the impeller speed was 42 percent of the selected maximum speed (as indicated by point e).

In view of the foregoing, it is clear that a single stage vortex pump, as described hereinabove is incapable of giving a speed-discharge pressure (and rate) characteristic, as indicated by the curve o—a—c—d in Fig. 3, which is required for a fuel boost pump.

I have found that this difficulty can be readily overcome by driving the above disclosed vortex pump through a variable speed drive comprising a hydraulic torque converter with suitable control, as shown in the right hand part of Fig. 1. The housing 8 of the torque converter drive encloses a liquid-filled reservoir 30 in which are rotatably mounted an impeller 31 and a coacting turbine runner 32, with an interposed stationary annular member 33, provided near its periphery with fixed guide blades 34. Impeller 31 is mounted upon and secured by a key 35 to a shaft 36 which is journalled in ball bearings 37 and 38 in housing 8, and is recessed at its outer end with a splined socket 39 for the reception of drive shaft 40 which is driven by the engine (not shown) to which the pump supplies motive liquid; said shaft 40 being suitably knurled at its inner end to engage the splines in said socket 39. A retaining ring 41, seated in a recess in the outer end of a central tubular opening 42, through which the shafts 36 and 40 extend, carries a sealing member 43 which prevents escape of liquid from reservoir 30.

Turbine runner 32 is mounted upon and keyed to shaft 9 by a key 44, and has secured to its outer peripheral flange (by bolts 45) a curved skirt 46 which encompasses the blade portion of impeller 31. Stationary member 33 is mounted upon and secured by a key 47 to a fixed shaft 48 which extends through tubular shaft 9 to the left end of housing 3 to which it is non-rotatably secured by a clamp plate 49 and bolts 50. Shaft seals 48a and 48b prevent escape of fluid from passage 25 between shafts 9 and 48. Impeller 31 and turbine runner 32 are respectively provided with contoured blades 51 and 52 that coact with stationary vanes 34 as in a conventional torque converter.

With the parts of the torque converter and vortex pump arranged as hereinabove described, it is clear that when impeller 31 is driven by the engine, through shafts 40 and 36, the rotation of its blades 51 causes the liquid in reservoir 30 to circulate through fixed vanes 34 and turbine blades 52 under a pressure which varies with the speed of the engine. The reaction of this circulating liquid on turbine blades 52 causes the turbine rotor 32 to rotate and drive vortex pump impeller 12, through shaft 9. After some initial slippage between impeller 31 and turbine rotor 32, incident to the inertia of the liquid in reservoir 30, when the impeller first starts to rotate, turbine rotor 32 and pump impeller 12 will rotate at engine speed so long as there is no escape of liquid from reservoir 30.

In order to drive pump impeller 12 in a variable speed relation to the speed (r.p.m.) of the engine, I provide for a controlled escape of liquid from reservoir 30 by means of a control valve mechanism, as shown in the lower part of Fig. 1. This control valve mechanism comprises a cylinder 53 which is hydraulically connected to reservoir 30 by conduits 54 and 55, and has a slidable spool valve 56 that alternatively opens communication between conduit 54 and an opposite conduit 57, while closing communication between conduit 55 and an opposite conduit 58, and vice versa. Conduits 57 and 58 are connected to a source of operating liquid under pressure, such as the lubricating oil sump of the engine, so that when valve 56 is moved from its central, neutral position, as shown in Fig. 1, to the right and opens communication between conduits 54 and 57, liquid escapes from reservoir 30 to said source, and conversely when valve 56 moves to the left of its neutral position and opens communication between conduits 55 and 58, liquid is supplied to reservoir 30 from said source.

As liquid is thus permitted to escape from reservoir 30, there ensues a corresponding slippage between the rotation of impeller 31 and turbine rotor 32, which progressively increases as the escape of liquid from reservoir 30 increases. This results in a correspondingly increasing difference in the relative speeds (r.p.m.'s) of impeller 31 and turbine rotor 32, so that, while impeller 31 continues to rotate at engine speed, turbine rotor 32 rotates at a progressively diminishing ratio to the speed of said impeller. Conversely, when liquid is supplied to reservoir 30 through conduits 58 and 55 by the movement of valve 56 to the left from its neutral position, the slippage between impeller 31 and turbine 32 decreases and the speed of the latter correspondingly increases with the return of liquid to reservoir 30.

Valve 56 is biased toward the left by a spring 59 whose tension is adjusted by a set screw 60, and the position of said valve is controlled by a piston 61, which is slidably mounted in a cylinder 62, and moves in response to the discharge fluid pressure in outlet passage 23, supplied to cylinder 52 through a conduit 63 which connects the left end of said cylinder to said outlet passage (see Figs. 1 and 2).

With the foregoing arrangement, it is apparent that as long as valve 56 is in its neutral position and no liquid leaves or enters reservoir 30, turbine rotor 32 and pump impeller 12 will be driven by impeller 31 in a definite, fixed ratio with the speed of the engine, said ratio depending upon the particular amount of liquid in the reservoir 30. It is further apparent, that if the engine speed increases, the speed of pump impeller 12 will similarly increase, with a corresponding increase in the discharge pressure of the pump. This increase in pump discharge pressure, transmitted to cylinder 62, will move piston 61 to the right, causing valve 56 to open communication between conduits 54 and 57 and permitting liquid to escape from reservoir 30, with a corresponding decrease in the speed of turbine rotor 32 and pump impeller 12. This continues until the decreasing pump discharge pressure falls to a point below the force of spring 59, whereupon said spring will return valve 56 to its neutral position and pump impeller 12 will thereupon be driven at a new lower speed ratio with respect to the speed of the engine. Conversely, if the speed of the engine decreases, valve 56 will be moved to the left of its neutral position, resulting in the rotation of pump impeller 12 at a higher speed ratio with respect to engine speed.

From what has been said above, it follows that the variable ratio between the speed of pump impeller 12 and engine speed is determined by the adjustment of spring 59 by set screw 60 and the contour of the curved portions of valve 56. Thus, if it is desired that the speed-discharge pressure characteristic of the fuel pump be changed from that of a direct engine-driven vortex pump, as indicated by the curve o—a—b of Fig. 3, to a variable speed-discharge pressure characteristic, such as that indicated by curve o—a—c—d of Fig. 3, the tension of spring 59 will be adjusted so that valve 56 commences to move to the right and discharge liquid from reservoir 30, when the engine speed reaches a value of say 20 percent of its maximum permissible speed, as indicated by point c in Fig. 3. The shape of curve c—d is then determined by the rate of spring 59 and the contour of the curved portions of valve 56. It is thus apparent that the pump discharge pressure can be made to bear any selected ratio to engine speed, not only at a particular engine speed (such as point a) and at maximum engine speed (such as point d), but also at any intermediate speed, as indicated by curve o—a—c—d of Fig. 3.

It is also apparent from the arrangement of elements in Fig. 1, that my invention provides in a single compact unit of simple construction, a high efficiency vortex pump with a variable speed drive yielding any selected engine speed-pump discharge pressure characteristic desired for the best performance of a fuel boost pump.

While I have shown and described the preferred embodiment of my invention, I desire it to be understood that I do not limit myself to the precise details of construction and arrangement of elements, disclosed by way of illustration, as these may be changed and modified by those skilled in the art without departing from the spirit of my invention or exceeding the scope of the appended claims.

I claim:

1. In a fuel supply system having a rotary-type prime mover with pumping means, driven by said prime mover, for supplying liquid fuel thereto, said means comprising a vortex-type fuel pump, driven by said prime mover, and having a rotary impeller with flat, straight, radial blades, so constructed and arranged as to generate in the pumped liquid fuel vortex currents which move at right angles to the plane of rotation of said impeller; first means, connecting said impeller to said prime mover, whereby said impeller is driven by, and in a selected, variable speed ratio with said prime mover; second means for applying the energy of said vortex currents to assist in driving said impeller; and third means, operatively associated with said impeller and said first means, for controlling the discharge pressure and rate of said pump, in accordance with any selected speed and discharge pressure characteristic desired.

2. A pump according to claim 1, wherein said second means is operatively associated with said impeller and said first means.

3. A pump according to claim 1, wherein all elements of said pump, including said impeller and said first, second and third means, are incorporated in a single, compact unit.

4. A pump according to claim 1, wherein said third means controls the discharge pressure and rate of said pump, so as to obtain any selected series of ratios between said discharge pressure and rate and the corresponding speed of said impeller.

5. A pump according to claim 1, wherein said first means comprises a hydraulic torque converter.

6. A pump according to claim 5, wherein said third means is actuated by the discharge pressure of said pump.

7. A pump according to claim 6, wherein said third means controls the speed ratio of said impeller to said prime mover by varying the quantity of liquid circulating in said torque converter.

References Cited in the file of this patent

UNITED STATES PATENTS

| | | |
|---|---|---|
| 879,059 | Ludewig | Feb. 11, 1908 |
| 2,400,306 | Hobbs | May 14, 1946 |
| 2,400,307 | Hobbs et al. | May 14, 1946 |
| 2,424,035 | Ifield | July 15, 1947 |
| 2,425,885 | Jennings | Aug. 19, 1947 |
| 2,441,855 | Trumpler | May 18, 1948 |
| 2,599,680 | Weeks | June 10, 1952 |
| 2,673,447 | Ifield et al. | Mar. 30, 1954 |